United States Patent [19]
Omura

[11] Patent Number: 5,210,710
[45] Date of Patent: * May 11, 1993

[54] MODULO ARITHMETIC PROCESSOR CHIP

[75] Inventor: Jimmy K. Omura, Cupertino, Calif.

[73] Assignee: Cylink Corporation, Sunnyvale, Calif.

[*] Notice: The portion of the term of this patent subsequent to Jan. 2, 2007 has been disclaimed.

[21] Appl. No.: 599,177

[22] Filed: Oct. 17, 1990

[51] Int. Cl.$^5$ .............................................. G06F 7/00
[52] U.S. Cl. ................... 364/746.1; 364/754; 364/768
[58] Field of Search ....................... 364/746.1, 768, 754

[56] References Cited

U.S. PATENT DOCUMENTS

| | | | |
|---|---|---|---|
| 3,552,374 | 7/1970 | Abrahamson et al. | 380/50 |
| 3,657,476 | 4/1972 | Aiken | 380/28 |
| 3,781,472 | 12/1973 | Goode et al. | 380/44 |
| 3,796,830 | 3/1974 | Smith | 380/49 |
| 3,798,359 | 3/1974 | Feistel | 380/49 |
| 3,868,631 | 2/1975 | Morgan et al. | 380/49 |
| 3,876,832 | 4/1976 | Morgan et al. | 380/28 |
| 3,958,081 | 5/1976 | Ehrsam et al. | 380/29 |
| 3,962,539 | 6/1976 | Ehrsam et al. | 380/49 |
| 3,979,558 | 9/1976 | Peterson | 380/41 |
| 4,037,093 | 7/1977 | Gregg et al. | 364/746.1 |
| 4,162,480 | 7/1979 | Berlekamp | 364/746.1 X |
| 4,200,770 | 4/1980 | Hellman et al. | 380/30 |
| 4,218,582 | 8/1980 | Hellman et al. | 380/30 |
| 4,251,875 | 2/1981 | Marver et al. | 364/746.1 |
| 4,405,829 | 9/1983 | Rivest et al. | 380/30 |
| 4,424,414 | 1/1984 | Hellman et al. | 380/30 |
| 4,538,240 | 8/1985 | Carter et al. | 364/746.1 X |
| 4,567,600 | 1/1986 | Massey et al. | 380/21 |
| 4,574,361 | 3/1986 | Inagawa et al. | 364/746.1 |
| 4,587,627 | 5/1986 | Omura et al. | 364/746.1 X |
| 4,697,248 | 9/1987 | Shirota | 364/746.1 X |
| 4,891,781 | 1/1990 | Omura | 364/746.1 X |
| 4,918,638 | 4/1990 | Matsumoto | 364/746.1 |
| 4,989,171 | 1/1991 | Hollmann | 364/746.1 |

OTHER PUBLICATIONS

Stewart, B. M., Theory of Numbers, The MacMillan Company, 1952 pp. 111–112, and 133–135.
Pohlig, Stephen C. and Martin E. Helman, "An Improved Algorithm for Computing Logarithms over GF(p) and Its Cryptographics Significance", IEEE Transactions on Information Theory, vol. IT-24, No. 1, Jan. 1978.
Abbruscato, C. R., "Data Encryption Equipment," IEEE Communications Magazine, vol. 22, No. 9, Sep. 1984.

(List continued on next page.)

Primary Examiner—Tan V. Mai
Attorney, Agent, or Firm—David Newman & Associates

[57] ABSTRACT

A processor chip for adding a first integer having a plurality of groups of bits to a second integer having a plurality of groups of bits modulo a fourth integer having n-bits. The first integer plus the second integer equals a third integer. The processor chip includes a first register for storing the first integer, a second register for storing the second integer, and feedback register for storing a feedback number. The feedback number is the two's complement of the fourth integer. A plurality of full adders is coupled to the first register and the second register, and adds each group of bits of the first integer to the corresponding group of bits of the second integer, to generate the third integer. The bits of each group are added asynchronously during a time period. Sequentially, a second group of bits of the first integer are added to the corresponding second group of bits of the second integer. The processor chip also multiplies the first integer by the second integer wherein the full adders sequentially add each group of bits of the second integer to each corresponding group of bits of the third integer, in response to the least significant bit position of the first integer shifted right from the first register. The processor chip can exponentiate a first integer having n-bits by a second integer having m-bits, wherein the first integer raised to the power of the second integer equals a third integer. The exponentiation is preformed with successive applications of the multiplication operation.

13 Claims, 7 Drawing Sheets

OTHER PUBLICATIONS

Neuwirth, Lee, "A Comparison of Four Key Distribution Methods," *Telecommunications,* Jul., 1986.

Barrett, Paul, MSc (Oxon), "Implementing the Rivest Shamir and Adleman Public Key Encryption Algorithm on a Standard Digital Signal Processor," Computer Security Ltd, Aug., 1986).

Barney, Clifford, "Cypher Chip Makes Key Distribution a Snap," *Electronics,* Aug. 7, 1986.

Sedlak, H. and Golze, U. "An RSA Cryptography Processor," Institute for Theoretisch Informatik Technische University Braunschweig (no date available).

Matyas, Stephen M., "Public Key Registration" (no date available).

Rankie, Gordon, Dr., "Thomas-A Complete Single Chip RSA Device." (no date available).

Rivest, Ronald L., "RSA Chips (Past/Present/Future)," MIT Laboratory for Computer Science (no data available).

Kochanski, Martin, "Developing an RSA Chip," Business Simulations, Ltd. (no date available).

Brickell, Ernest F., "A Fast Modular Multiplication Algorithm with Application to Two Key Cryptography." (no date available).

Orton, G. A., Roy, M. P., Scott, P. A., Peppard, L. E., and Tavares, S. E., "VLSI Implementation of Public-Key Encryption Algorithms," Department of Electrical Engineering, Queen's University. (no date available).

Beth, T., Cook, B. M., and Gollmann, D., "Architectures for Exponentitation in $GR(2^n)$." (no date available).

Diffie, W. and M. E. Hellman, "New Directions in Cryptography", *IEEE Transactions on Information Theory,* vol. IT-22, Nov. 1976, pp. 644–654.

MODULO ARITHMETIC PROCESSOR CHIP

BACKGROUND OF THE INVENTION

This invention relates to a processor chip which is designed to be a small cell in a multicell smart card chip for computing addition, multiplication, and exponentiation of integers modulo another integer.

DESCRIPTION OF THE PRIOR ART

Cryptographic systems transmitting a computationally secure cryptogram which is generated from a publicly known transformation of a message sent by a transmitter have been described in several patents, including U.S. Pat. No. 4,200,770 to Hellman et al., U.S. Pat. No. 4,405,829 to Revest et al., U.S. Pat. No. 4,218,582 to Hellman et al., and U.S. Pat. No. 4,424,414 to Hellman et al. Some of these teach the broad concept of using a secure cipher key that is generated by a set of conversers from transformations of exchange transform signals. A set of conversers each possess a secret number and exchange an initial non-secret transformation of the secret number with the other converser. The received non-secret transformation of the other converser's secret number is again transformed with the receiving converser's secret number to generate a secure cipher key. The transformations use known operations that are easily performed but extremely difficult to invert. It is believed infeasible for an eavesdropper to invert the initial non-secret transformation to obtain either converser's secret number, or duplicate the latter transformation and obtain the secure cipher key. Some of these patents also teach methods for creating digital signatures that have the property that they are a function of the message that is signed and a unique secret number of the signer while anyone can verify the authenticity of the signature and the integrity of the signed message without knowing any secret of the signer. The verifier needs to know only the public number corresponding to the secret number of the signer of the message.

These patents do not teach the particular means or apparatus necessary for implementing their broad inventive concepts as a processor chip. In particular, none of these patents teach how to build a processor chip for performing the necessary transformations for passing a secure key or creating digital signatures.

These patents do not teach how to implement these transformations in rapid fast method on a processor chip. U.S. Pat. No. 4,891,781 to Omura teaches a fast method and apparatus for implementing public key transformations on a processor chip. The Omura patent achieves the fast speed without regards to size and cost, however.

OBJECTS AND SUMMARY OF THE INVENTION

An object of the present invention is to provide a processor chip for computing addition, multiplication, and exponentiation in the Galois Field of integers modulo a prime number p. These same operations can be done with any integer modulus using this invention.

Another object of the present invention is to provide a processor chip for performing an exponentiation operation in a rapid manner.

A further object of the present invention is to provide a processor chip that is small enough to be used as a cell in a multicell smart card chip. The processor chip sacrifices some speed of computations to minimize the number of circuits required and thus reducing silicon area of the cell.

According to the present invention, as embodied and broadly described herein, a processor chip for adding a first integer having a plurality of groups of bits, to a second integer having a plurality of groups of bits, wherein the first integer plus the second integer equals a third integer having n-bits, modulo a fourth integer having n-bits, is provided, comprising first register means for storing the first integer, second register means for storing the second integer, and feedback means for generating and storing a feedback number. The feedback number is the two's complement of the fourth integer. The present invention includes arithmetic means coupled to the first register means and the second register means. The arithmetic means sequentially adds each group of bits of the first integer to the corresponding group of bits of the second integer, thereby generating the third integer. By sequentially adding each group of bits is meant that a first group of bits of the first integer are added to the corresponding first group of bits of the second integer. The bits of each of these groups are added asynchronously during a time period, which might be, for example, a clock period or cycle. Subsequently, a second group of bits of the first integer are added to the corresponding second group of bits of the second integer. Any carry bit from the adding of the first group of bits of the first and second integers is added to the second group of bits. This process of adding groups of bits of the first and second integer is repeated with all the groups of bits of the first and second integers. The result of the sequentially adding the groups of bits is the third integer.

The third integer is stored in accumulator means which is coupled to arithmetic means. The invention further includes overflow means coupled to the accumulator means for storing an overflow integer which is overflowed from the third integer. Additionally, means is provided for fetching the feedback number into the second register and adding the feedback number using arithmetic means to the third integer in the accumulator using arithmetic means to the third integer in the accumulator means. Also, means coupled to the accumulator means and responsive to the third integer being greater than the fourth integer, is provided for reducing the third integer modulo the fourth integer.

A second aspect of the present invention includes a processor chip for multiplying a first integer by a second integer having a plurality of groups of bits, wherein the first integer times the second integer equals a third integer having a plurality of groups of bits, modulo a fourth integer having n-bits. The processor chip for multiplying includes first register means for storing the first integer, second register means for storing the second integer, feedback means for generating a feedback number, and the arithmetic means coupled to the first register means and the second register means. In response to the least significant position of the first integer shifted right from the first register means, arithmetic means sequentially adds each group of bits of the second integer to the corresponding group of bits of the third integer. Accumulator means is provided coupled to the arithmetic means for storing the third integer. Also included is overflow means coupled to the accumulator means for counting and storing overflow bits as an overflow integer and second partial reduction means coupled to the overflow means, the feedback means, the first register means and the second register means, and responsive to the completion of multiplying the first integer by the second integer, for transferring the feedback number into the second register means, and multiplying the feedback number by the overflow integer to generate a product, and adding the product to the third integer in the accumulator register means. Means is provided coupled to the accumulator means and responsive to the third integer being greater than the fourth integer, for reducing the third integer modulo the fourth integer. Also, first partial reduction means is included coupled to the second register means and responsive to the most significant position of the second integer shifted left from the second register means, for adding the feedback number to the second integer, thereby partially reducing the second integer.

A third aspect of the present invention includes a modulo arithmetic processor chip for exponentiation of a first integer having n-bits by a second integer having m-bits, wherein the first integer raised to the power of the second integer equals a third integer having n-bits, modulo a fourth integer having n-bits. The modulo arithmetic processor chip for exponentiation includes first register means for storing the first integer, second register means for storing the second integer, feedback means for generating a feedback number, wherein the feedback number equals the two's complement of the fourth integer. The exponentiation is done with successive applications of the multiplication operation including the special case of squaring integers. Accumulator means is provided coupled to the arithmetic means for storing the third integer.

Additional objects and advantages of the invention will be set forth in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute part of this specification, illustrate a preferred embodiment of the invention, and together with the description, serve to explain the principles of the invention.

DETAILED DESCRIPTION OF THE PREFERRED EMBODIMENTS

Figure 1:
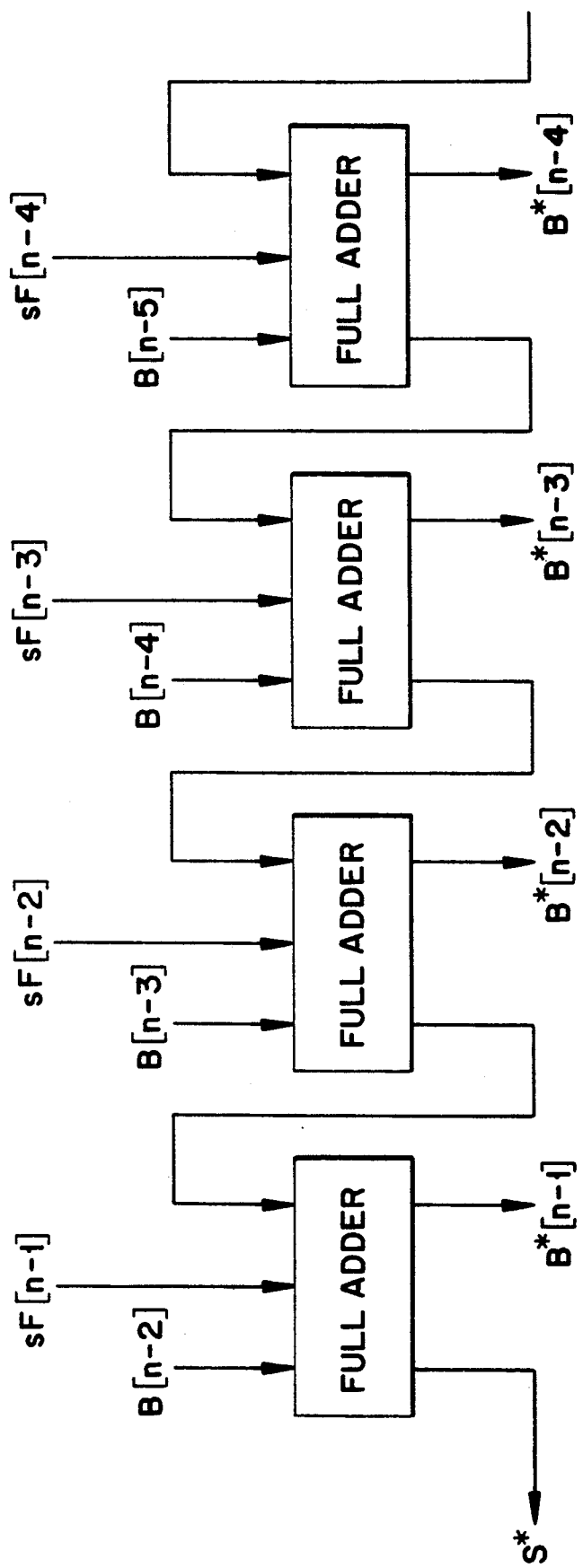
FIG. 1 illustrates the shifting operation of the processor chip of the present invention.

The invention disclosed in this patent application is related to U.S. Pat. No. 4,891,781, issued Jan. 2, 1990, to Omura, and entitled "Modulo Arithmetic Processor Chip," which is incorporated herein by reference.

Reference will now be made in detail to the present preferred embodiments of the invention, an example of which is illustrated in the accompanying drawings, wherein like reference numerals indicate like elements throughout the several views.

A preferred embodiment of the present invention includes a processor chip for adding a first integer having a plurality of groups of bits, to a second integer having a plurality of groups of bits. The first integer plus the second integer equals a third integer having n-bits, modulo a fourth integer having n-bits. The processor chip includes first register means for storing the first integer, second register means for storing the second integer, and feedback means for generating and storing a feedback number. The feedback number is the two's complement of the fourth integer. The present invention includes arithmetic means coupled to the first register means and the second register means. The arithmetic means sequentially adds each group of bits of the first integer to each corresponding group of bits of the second integer, respectively, thereby generating the third integer. By sequentially adding each group of bits is meant that a first group of bits of the first integer is added to the corresponding first group of bits of the second integer. The first group of bits of the first and second integer typically might be a group of least significant bits of the first and second integer. A group of bits also can be as small as one bit. After the first group of bits are added, a second group of bits of the first integer are added to the corresponding second group of bits of the second integer. Any carry bit from adding the first group of bits of the first and second integers is added to the second group of bits of the first and second integers. The bits within a group are added asynchronously during a time period, which might be, for example, a clock period or clock cycle. This process of adding groups of bits of the first and second integers is repeated with all the groups of bits of the first and second integers.

By adding the first and second integers by groups of bits, only a set of full adders, for example, are required for adding a group of bits. The full adders repetitively can be used for adding corresponding groups of bits. The repetitive use of full adders reduces the requirement of full adders for a particular processor chip, and thus the area on the chip for full adders.

Figure 3:
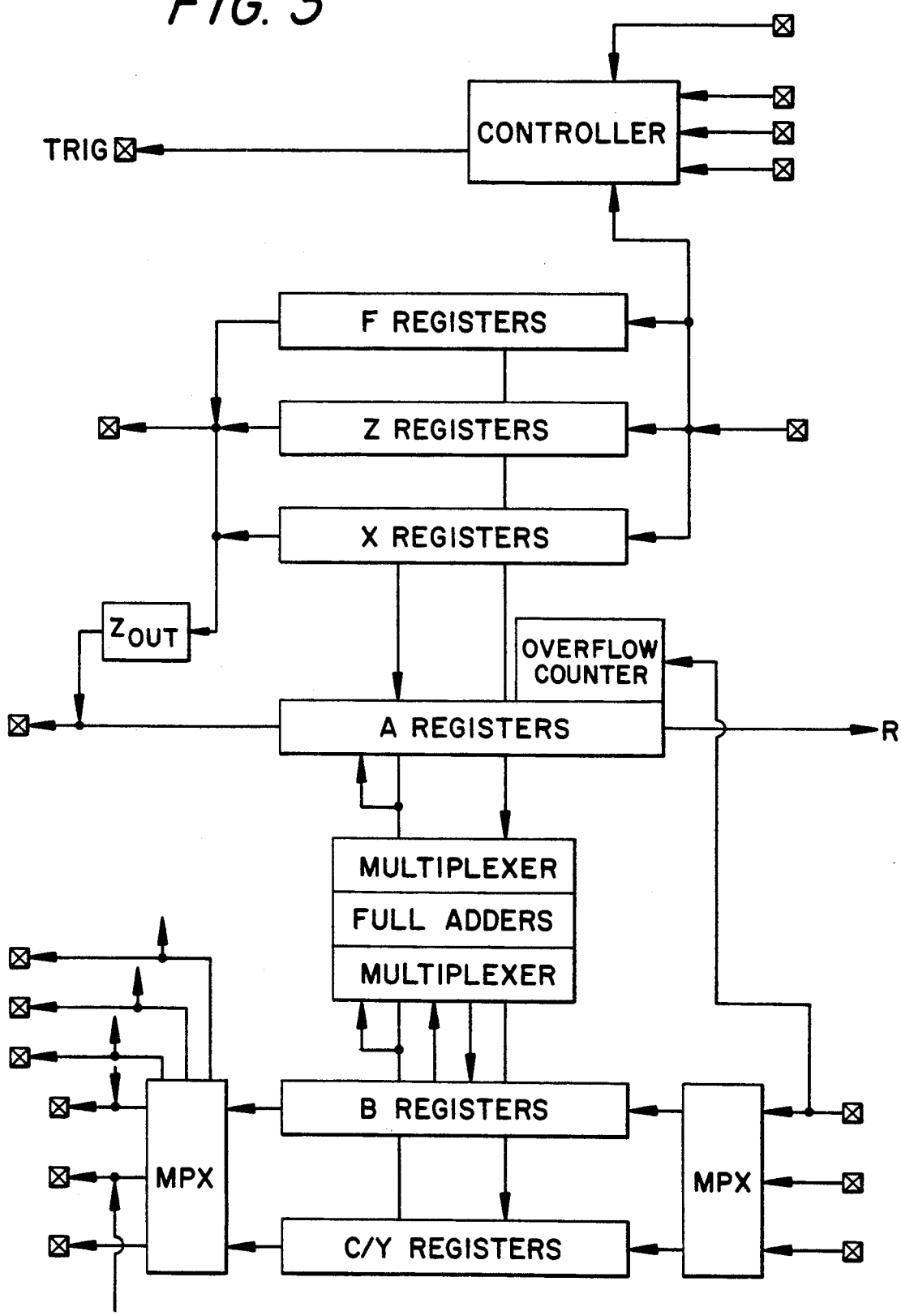
FIG. 3 illustrates the basic structure of the processor chip of the present invention.

In the exemplary arrangement shown in FIG. 3, first register means is shown as A registers, second register means is shown as B registers. Arithmetic means, by way of example, includes full adders, and multiplexers interfacing the full adders for providing the switching function for switching between the groups of bits of the first integer A and second integer B for addition. Accumulator means may be embodied as C/Y registers.

The third integer is stored in accumulator means which is coupled to arithmetic means. The result of sequentially adding the groups of bits of the first and second integer is the third integer.

The invention further includes overflow means coupled to the accumulator means for storing an overflow integer which is overflowed from the third integer. Additionally, means is provided for fetching the feedback number into the second register and adding the feedback number using arithmetic means to the third integer in the accumulator means. Also, means coupled to the accumulator means and responsive to the third integer being greater than the fourth integer, is provided for reducing the third integer modulo the fourth integer.

A second aspect of the present invention includes a processor chip for multiplying a first integer, by a second integer having a plurality of groups of bits, wherein the first integer times the second integer equals a third integer having a plurality of groups of bits, modulo a fourth integer having n-bits. The processor chip includes first register means for storing the first integer, second register means for storing the second integer, feedback means for generating a feedback number, and arithmetic means coupled to the first register means and the second register means. The arithmetic means adds sequentially each group of bits of the second integer to the corresponding group of bits of the third integer in response to the least significant position of the first integer shifted right from the first register means.

Accumulator means is provided coupled to the arithmetic means for storing the third integer. Also included is overflow means coupled to the accumulator means for counting and storing overflow bits as an overflow integer and second partial reduction means coupled to the overflow means, the feedback means, the first register means and the second registered means, and responsive to the completion of multiplying the first integer by the second integer, for transferring the feedback number into the second register means, and multiplying the feedback number by the overflow integer to generate a product, and adding the product to the third integer in the accumulator register means. Means is provided coupled to the accumulator means and responsive to the third integer being greater than the fourth integer, for reducing the third integer modulo the fourth integer. Also, first partial reduction means is included coupled to the second register means and responsive to the most significant position of the second integer shifted left from the second register means, for adding the feedback number to the second integer, thereby partially reducing the second integer.

A third aspect of the present invention includes a modulo arithmetic processor chip for exponentiation of a first integer having n-bits by a second integer having m-bits, wherein the first integer raised to the power of the second integer equals a third integer having n-bits, modulo a fourth integer having n-bits. The modulo arithmetic processor chip for exponentiation includes first register means for storing the first integer, second register means for storing the second integer, feedback means for generating a feedback number, wherein the feedback number equals the two's complement of the fourth integer. The exponentiation is done with successive applications of the multiplication operation including the special case of squaring integers. Accumulator means is provided coupled to the arithmetic means for storing the third integer.

The present invention also may be viewed as having a register with L-bits storage for storing an n-bit integer X, a register with L-bits storage for storing an m-bit integer Z, an A register for storing L-bits, and a B register for storing L-bits. The invention includes means for transferring the n-bit integer X from the X register into register A and for transferring the m-bit integer Z from the Z register into register B. Also included are control means connected to the B and A registers for generating control signals. A control signal applied to the A register is used in multiplication while the control signal applied to the B register is used in the shifting operation required in multiplication. There is also a register with L-bits storage for storing an n-bit integer F and a register with L-bits for storing the accumulator integer and output.

B registers for storing L-bits, and a C registers for storing L-bits are coupled to a full adder. The control logic also is coupled to the full adder, and the full adder is responsive to a control signal being a 1-bit from the control logic, for shifting left and adding data stored in the B registers to data stored in the C registers. The full adder is responsive to the control logic signal for shifting left data in the B registers which is used in multiplication of integers. A feedback register having L-bits for storing an n-bit feedback number is included along with means for generating a feedback number from a prime number, p, having n-bits and storing the feedback number in the feedback register. Modulo means is coupled to the feedback register and the C register for reducing data bits stored in the C registers modulo the prime number p and storing the L-bits integer in the Y register. The Y register is for storing the L-bit output.

The processor chip of the present invention computes addition, multiplication, and exponentiation in the Galois Field of integers modulo a prime number p, GF(p). Also this chip can be used for computing addition, multiplication, and exponentiation in the ring of integers modulo a composite number, the factorization of which is kept secret, such as in the RSA public key cryptographic scheme. The following discussions focus on the Galois Field GF(p) where p is a prime number although the chip is capable of integer addition, multiplication, and exponentiation modulo any integer.

The processor chip of the present invention makes use of two properties of the "modulo p" reduction:

$$(A+B) \bmod p = [(A \bmod p) + (B \bmod p)] \bmod p$$

$$AB \bmod p = [(A \bmod p)(B \bmod p)] \bmod p$$

Thus, the modulo p reduction of a sum or product of terms may be done on each term first. In fact only a partial reduction may be done on any one or more terms in a sum or product without changing the final answer.

The modulus p is an n-bit integer that can be represented by the n binary numbers $P[n-1]$, $P[n-2]$, ..., $P[1]$, and $P[0]$ in the usual radix-2 form $$p = P[n-1]2^{n-1} + P[n-2]2^{n-2} + \ldots + P[1]2 + P[0].$$

In this design note that p can also be represented in a two's complement form by n binary numbers $F[n-1]$, $F[n-2]$, ..., $F[1]$, and $F[0]$ where $$p = 2^n - F$$

and $$F = F[n-1]2^{n-1} + F[n-2]2^{n-2} + \ldots + F[1]2 + F[0].$$

Since $2^n = p + F$ this representation results in the useful relationship $$2^n \bmod p = F. \qquad (1)$$

Essentially this says that $2^n$ is equivalent to the n-bit number F when doing modulo p arithmetic. This relationship is used throughout the processor chip as follows:

If we have an (n+1)-bit integer "B" represented by the binary numbers B[n], B[n-1], B[n-2], ..., B[I], and B[0] in the form $B=B[n]2^n+B[n-1]2^{n-1}+B[n-2]2^{n-2}+ \ldots +B[1]2+B[0]$. Thus $B=B[n]2^n+B_o$ where "$B_o$" is the n-bit integer represented by the same binary numbers without the highest order bit, then $$B \bmod p = \{B[n]2^n + B_o\} \bmod p \quad (2)$$
$$= \{B[n]2^n \bmod p + B_o\} \bmod p$$
$$= \{B[n]F + B_o\} \bmod p.$$

Thus for any (n+1)-bit integer "B" the modulo p reduction can be done partially by throwing out the highest order bit, B[n], and adding the n-bit integer "F" to the integer "$B_o$", formed by the remaining n binary numbers of "B". This partial reduction is used throughout the processor chip to keep the number of binary symbols representing integers limited to an equivalent n-bit representation.

The above reduction easily can be generalized. Suppose that "C" is an m-bit integer where m > n. Then "C" can be expressed as $$C = I2^n + C_o$$

where "I" is an m-n bit integer and "$C_o$" is an n-bit integer.

Then the modulo p reduction can have the form $$C \bmod p = \{I2^n + C_o\} \bmod p \quad (3)$$
$$= \{(I2^n \bmod p) + C_o\} \bmod p$$
$$= \{I[2^n \bmod p] + C_o\} \bmod p$$
$$= \{IF + C_o\} \bmod p.$$

Here all the m-n highest order bits of "C" are collected together to form $I2^n$ which is then partially reduced to IF, the product of the m-n bit integer "I" and the n-bit integer "F". Basically the integer $2^n$ is simply replaced by the equivalent n-bit integer F as given by Equation (1).

Consider exponentiation in GF(p). Let X be an element of GF(p) and B an m-bit integer represented by $$Z = Z[m-1]2^{m-1} + Z[m-2]2^{m-2} + \ldots + Z[1]2 + Z[0].$$

Any element of GF(p) such as X also has a representation given by $$X = X[n-1]2^{n-1} + X[n-2]2^{n-2} + \ldots + X[1]2 + X[0].$$

Here $\{Z[i]\}$ and $\{X[i]\}$ are binary symbols. Consider computing the following:

$$Y = X^Z \bmod p$$

where Y is, of course, an element in GF(p). The basic operations of exponentiation for this processor chip are derived by the following equation:

$$X^Z = X^{\{Z[0]+2Z[1]+2^2Z[2]+\ldots+2^{m-1}Z[m-1]\}}$$
$$= X^{Z[0]}(X^2)^{Z[1]}(X^{2^2})^{Z[2]} \ldots (X^{2^{m-1}})^{Z[m-1]}$$
$$= X^{Z[0]}\{X^{Z[1]}(X^2)^{Z[2]} \ldots (X^{2^{m-2}})^{Z[m-1]}\}^2$$
$$= X^{Z[0]}\{X^{Z[1]}\{X^{Z[2]} \ldots (X^{2^{m-3}})^{Z[m-1]}\}^2\}^2.$$

Note that by defining $$E_k = X^{Z[m-k]}(X^2)^{Z[m-k+1]} \ldots (X^{2^{k-1}})^{Z[m-1]}$$

k = 1, 2, ..., m
one has the exponentiation algorithm $$E_1 = X^{Z[m-1]},$$

$$E_k = X^{Z[m-k]} E^2_{k-1}$$

k = 2, 3, ..., m
where $$X^Z = E_m$$

and $$Y = E_m \bmod p.$$

This invention has control logic to compute exponentiation of X by Z modulo a third integer p where the bits in the Z register are shifted left. On the $k^{th}$ shift the control logic on the end of the Z register uses Z[m-k] in the exponentiation algorithm described above.

Exponentiation comprises a series of multiplications modulo p. For any two integers A and B $$AB \bmod p = (A \bmod p)(B \bmod p) \bmod p.$$

Thus each product of integers modulo p needs not be reduced until all products that form the exponentiation is completed. In addition, a partial reduction at each stage can be performed using the relationship in Eq. (1). This partial reduction allows representing all integers by n binary symbols.

MULTIPLY ALGORITHM

The heart of the processor chip is the GF(p) multiply operation. Consider two n-bit integers A and B that belong to GF(p). These are any two integers less than p. Consider the required multiplier operation $$C = AB \bmod p.$$

A, B, and C are referred to as the "multiplier," the "multiplicand," and the "product," respectively.

For the following discussion assume that all integers are represented by n binary numbers and the registers holding these integers are n-bit registers. This will be generalized later.

A. Multiplier

A "shift and add" multiplier includes having the "multiplier" integer A which is held in an n-bit register, being shifted to the right (higher order bits are on the left) into a control logic used to control the adding of the shifted "multiplicand" integer B which is held in an n-bit register to the "product" accumulator given by integer C which is held in an n-bit register. The control logic for the multiplier is at the right end of the n-bit register for integer A. The control logic signal, denoted R, is the last bit shifted out of the A register.

The multiplier logic at the right end of the A register is used to control the adding of the shifted multiplicand in the B register to the product accumulator in the C register.

B. Multiplicand

The multiplicand is held in a n-bit register B which is shifted left (multiplied by 2). Before each left shift of the B register, these register bits are added or not added to the product accumulator register C depending on the multiplier logic output bit R at the right end of the A register.

The multiplicand B has the form $$B = \sum_{k=0}^{n-1} B[k]2^k$$

or on rearranging terms, the form $$B = \sum_{k=0}^{n-2} B[k]2^k + B[n-1]2^{n-1}.$$

Multiplying by 2 gives $$2B = \sum_{k=1}^{n-1} B[k-1]2^k + B[n-1]2^n$$

Recall that each $2^n$ term can be replaced by the feedback terms given by F using Eq. (1). Specifically $$2B \bmod p = \sum_{k=1}^{n-1} B[k-1]2^k + B[n-1]2^n \bmod p$$

Thus $$\sum_{k=1}^{n-1} B[k-1]2^k + B[n-1]F$$

is a partially reduced n-bit integer that is equal to 2B when fully reduced modulo p.

The procedure for shifting B is as follows:

Initial Condition:

$$B = \sum_{k=0}^{n-1} B[k]2^k$$

is the initial register integer.

Shift B to get B* according to:

$$B^* = \sum_{k=0}^{n-1} B^*[k]2^k$$

$$= \sum_{k=1}^{n-1} B[k-1]2^k + B[n-1]F$$

Here B is the original register integer, and B* is the partially reduced form of 2B, the shifted register integer.

FIG. 1 illustrates this shifting operation using full adders where $s = B[n-1]$. In this implementation the addition operation requires carry propagation where the full adder first starts with the least significant group of bits and then moves to the next significant bit with the carry term from the lower significant full adder output. This carry propagation can be done asynchronously for each group of bits in an IC chip using the natural propagation which is not clocked by the basic chip clock. In particular there will be several carry and full adder operations between each clock of the chip, for each group of bits.

The use of single register representation for each integer in the circuit results in the need for addition with carry propagation. Faster addition operations can be achieved with double registers representing each integer where one of the registers for each integer holds the carry terms in each addition. This allows a complete parallel full adder operation on all the bits of the two integers being added in one clock cycle. This double register representation, however, requires more circuits in the form of registers. In this design some sacrifice in speed is made to reduce the amount of circuits required.

C. Accumulator

At any given time, the integer B in the multiplicand register has the form $$B = \sum_{k=0}^{n-1} B[k]2^k$$

If $R = 1$, this is added to the integer C, which includes an n-bit register. The problem of handling overflow terms must be taken care of using Equation (1). Since no shifting of the C register is involved, all the overflow terms in the C register are accumulated until all shifts and adds are completed. At the end of the shifts and adds, all the accumulated overflow terms are added back to the C registers to obtain the final answer.

Figure 2:
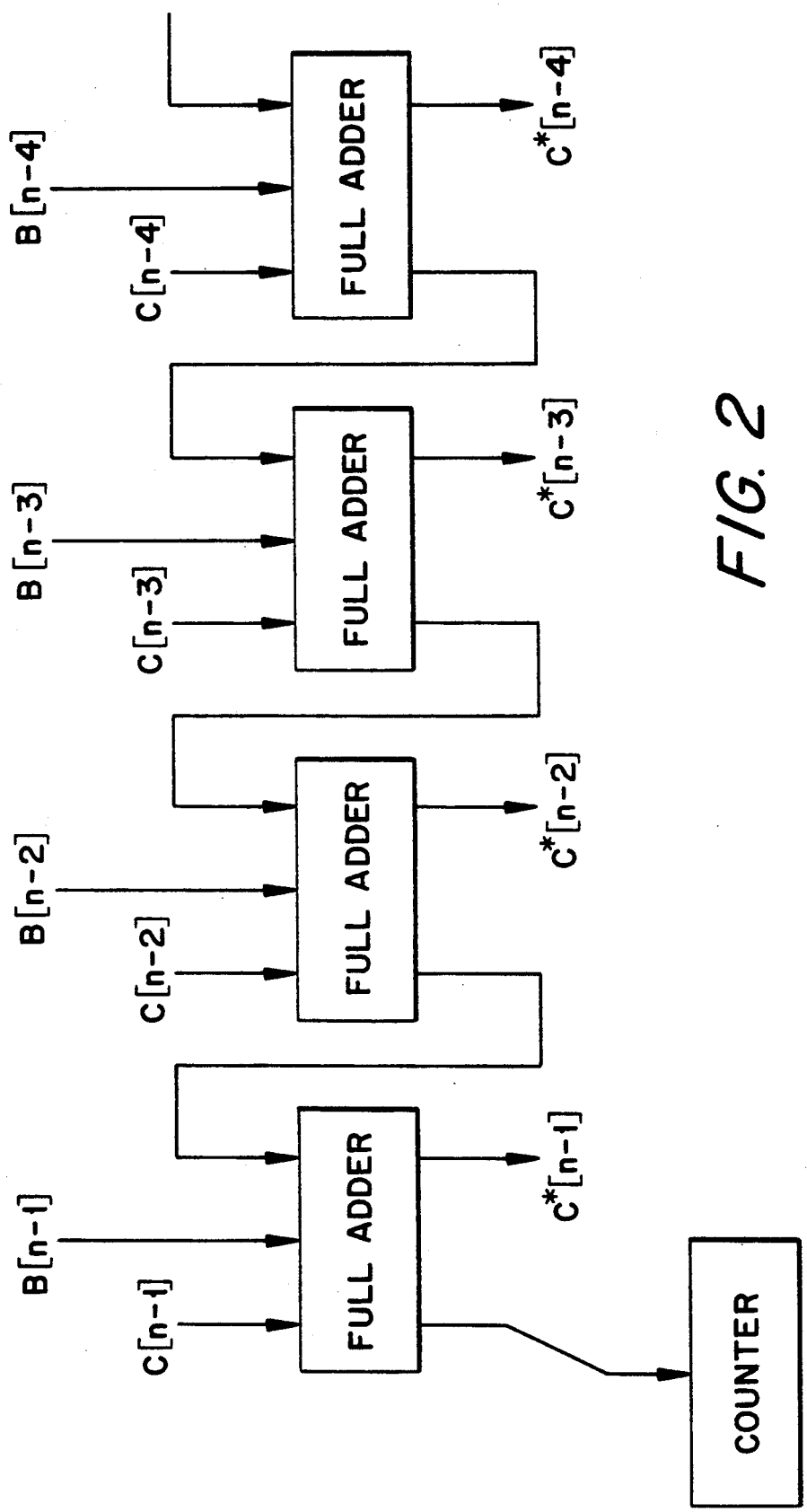
FIG. 2 illustrates the accumulator operation of the processor chip of the present invention.

Assuming $R = 1$, adding of B to C is illustrated in FIG. 2 in terms of one complete set of full adders. Here again the addition of integers is done by starting with the least significant group of bits of the two integers being added and taking the carry term out of one full adder to the input to the next significant group of bits full adder. Although this carry propagation form of the addition of two integers is slower than using extra registers to hold carry terms, it minimizes the number of register circuits required.

After all shifts and adds are completed, the counter contains an integer I and the final product AB mod p is obtained by adding $I2^n$ to the integer C contained in the accumulator n-bit registers. This is done by replacing $2^n$ by $F = 2^n \bmod p$ and adding IF to the accumulator registers by restarting the multiplication shift and add operations with A replaced by I and B replaced by F and starting with the current C register values. This is repeated until a shift and add cycle is completed and $I = 0$.

Note that if the original integers A and B comprise n bits each, then each addition of the contents of the multiplicand register to the accumulator register adds at most a one overflow bit to I. Thus $I \leq n$. Thus the counter has count integer I that is no higher than 2n. For $n = 1024$, one only needs a 10-bit counter. Thus the counter value I is at most a 10-bit integer, and the shift and add cycles associated with adding IF to the accumulator is short compared to the original shift and add cycle.

REDUCTION MODULO-p

The single n-bit representation of C is $$C = \sum_{k=0}^{n-1} C[k]2^k.$$

Assume that the highest order bit of p is one. Then $$p = \sum_{k=0}^{n-1} P[k]2^k$$

where $P[n-1]=1$. This is not a restriction since n is by definition the minimum number of bits necessary to represent p.

Thus $$p \geq 2^{n-1}$$

or $$2p \geq 2^n$$

and $$C < 2p.$$

If the representation of C is greater than p, that is, $$C > p,$$

then it is desirable to convert C to C-p by performing the following steps:
Step 1: Set $Y \leftarrow C$
Step 2: Set $C \leftarrow C+F$
Step 3: Check counter I
If $I=0$, stop.
If $I \neq 0$, set $Y \leftarrow C$ and stop.

To show that this is correct, note that the final answer is either the single n-bit representation C which satisfies $$0 < C < 2p$$

or if C is greater than p, it is C-p which satisfies $$0 < C\text{-}p < p.$$

Since $$p = 2^n - F$$

then $$C+F = 2^n + (C-p).$$

If after computing $C+F$, one has $I \neq 0$, then $C-p \geq 0$ or $C \geq p$ and the latest contents of the C register are accepted as the answer. Otherwise, if $I=0$, the original C register value (before adding F) is the desired answer.

PROCESSOR CHIP

The following presents the general features of the processor chip that computes $$Y = X^Z \bmod p$$

$$Y = XZ \bmod p$$

and $$Y = X+Z \bmod p.$$

A. Normal Basic Structure

The basic structure of the processor chip is illustrated in FIG. 3, comprising six L-bit registers, L full adders, and control and feedback logic. The prime number feedback term is F. Other inputs to this chip are the first integer X and the second integer Z. Assume that all these integers are represented by L-bits and that the prime number p is an L-bit integer. The final exponentiation is located in the L-bit registers Y which also serves as the accumulator register C. Anytime after loading the F, Z, and X registers, a start command can initiate the add, multiply, or exponentiation computation. Loading the registers is not allowed during computations.

Since exponentiation comprises a sequence of multiply operations, the basic structure of FIG. 3 is primarily a GF(p) multiplier. The final answer ends up in the L-bit registers C, which is then loaded into the Y registers. The Y registers can only be read out after all computations are executed.

The bulk of the basic structure comprises the set of 6 L-bit registers and L full adders. A vertical slice through this basic structure, is shown as the basic cell of FIG. 4. The bulk of the basic structure of FIG. 3 includes identical copies of the basic cell shown in FIG. 4 that are cascaded L times much like a set of register cells.

Figure 4:
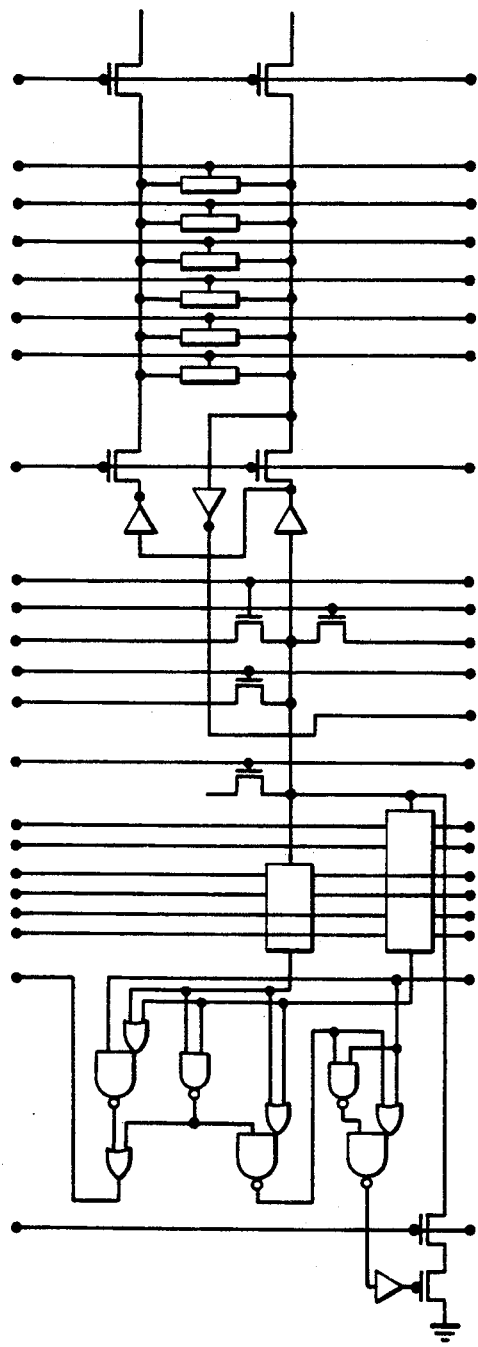
FIG. 4 illustrates the basic cell of the processor chip of the present invention.
Figure 8:
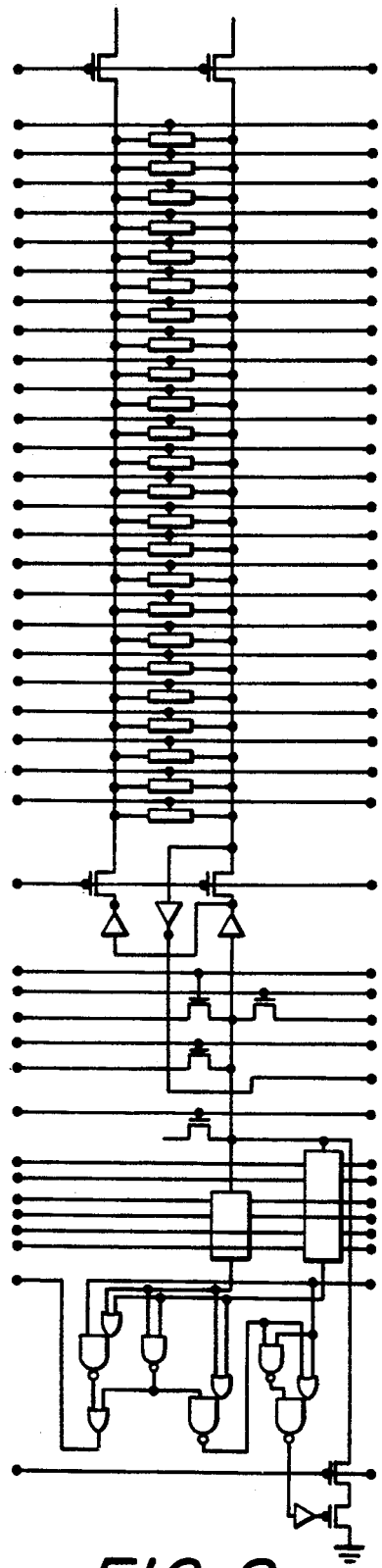
FIG. 8 illustrates how the number of full adder circuits can be reduced by having them time shared in the computations.

The basic cell comprises 6 registers and a single full adder which when cascaded together do the operations shown in FIGS. 1 and 2. Illustrated in FIG. 4 are load lines and communication lines where a basic cell receives inputs from two right adjacent cells and sends outputs to two left adjacent cells. Also there is a control bit R that goes to all cells from right to left and three feedback bit $B[n-1]$ that goes to all cells from left to right.

B. Mismatch

Up to this point, the processor chip includes L basic cells and, therefore, all integers of interest are L-bit integers. The prime number p also is assumed to be an L-bit prime integer. Consider the processor chip having L basic cells as before but now the prime number is represented by n bits where $n \leq L$ and Z is represented by m bits. The chip structure of L basic cells can be used to obtain the desired exponentiation.

Figure 5:
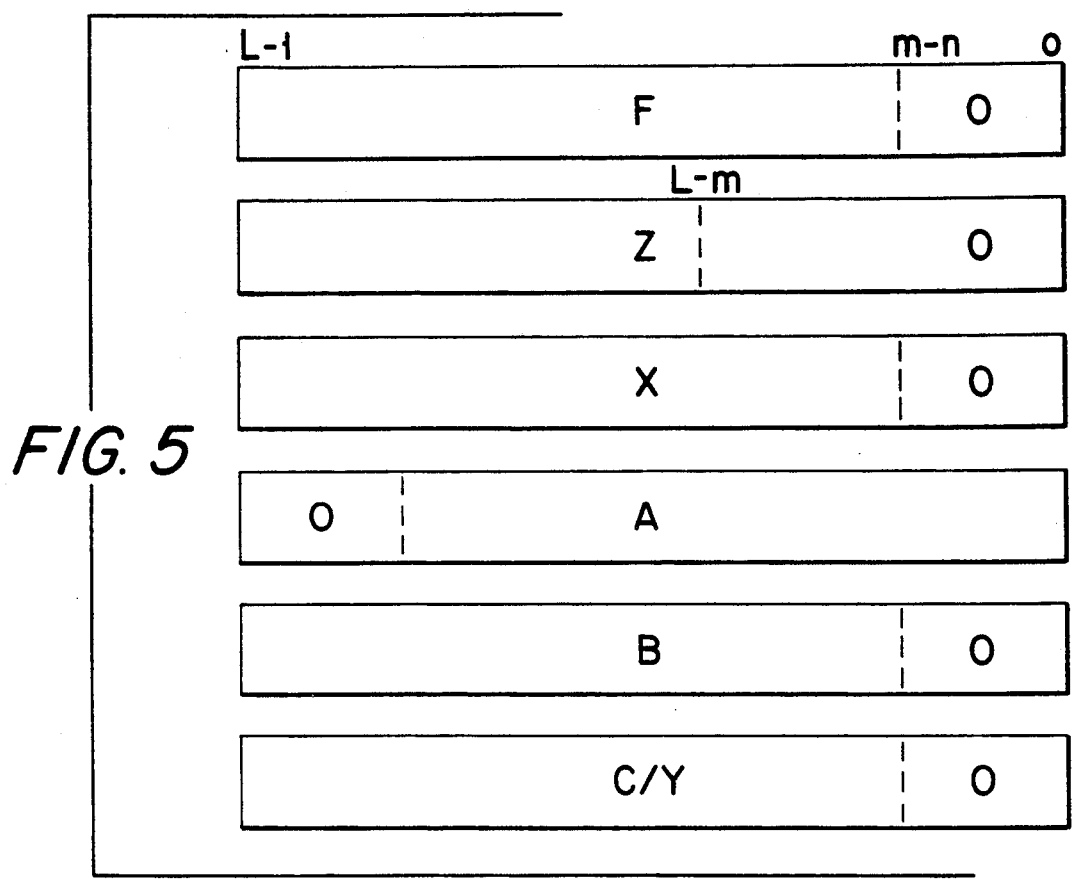
FIG. 5 illustrates the registers configuration of the present invention.
Figure 7:
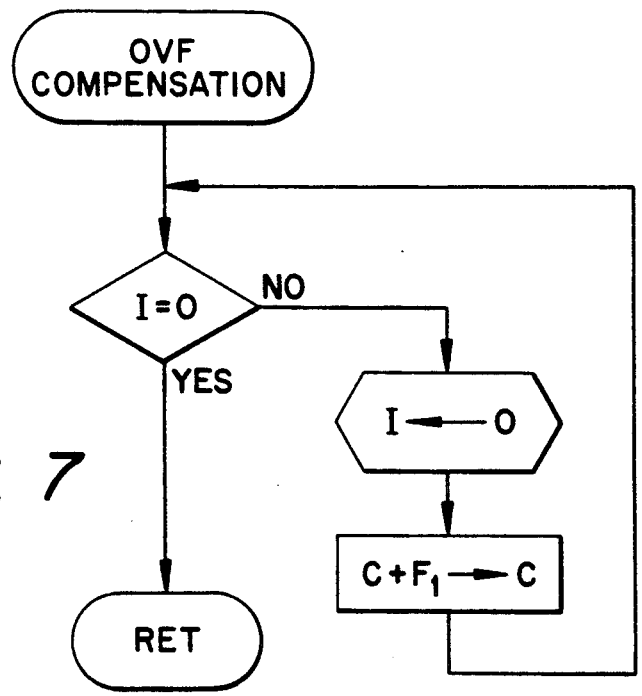
FIG. 7 illustrates the overflow compensation subroutine of the present invention.
Figure 6:
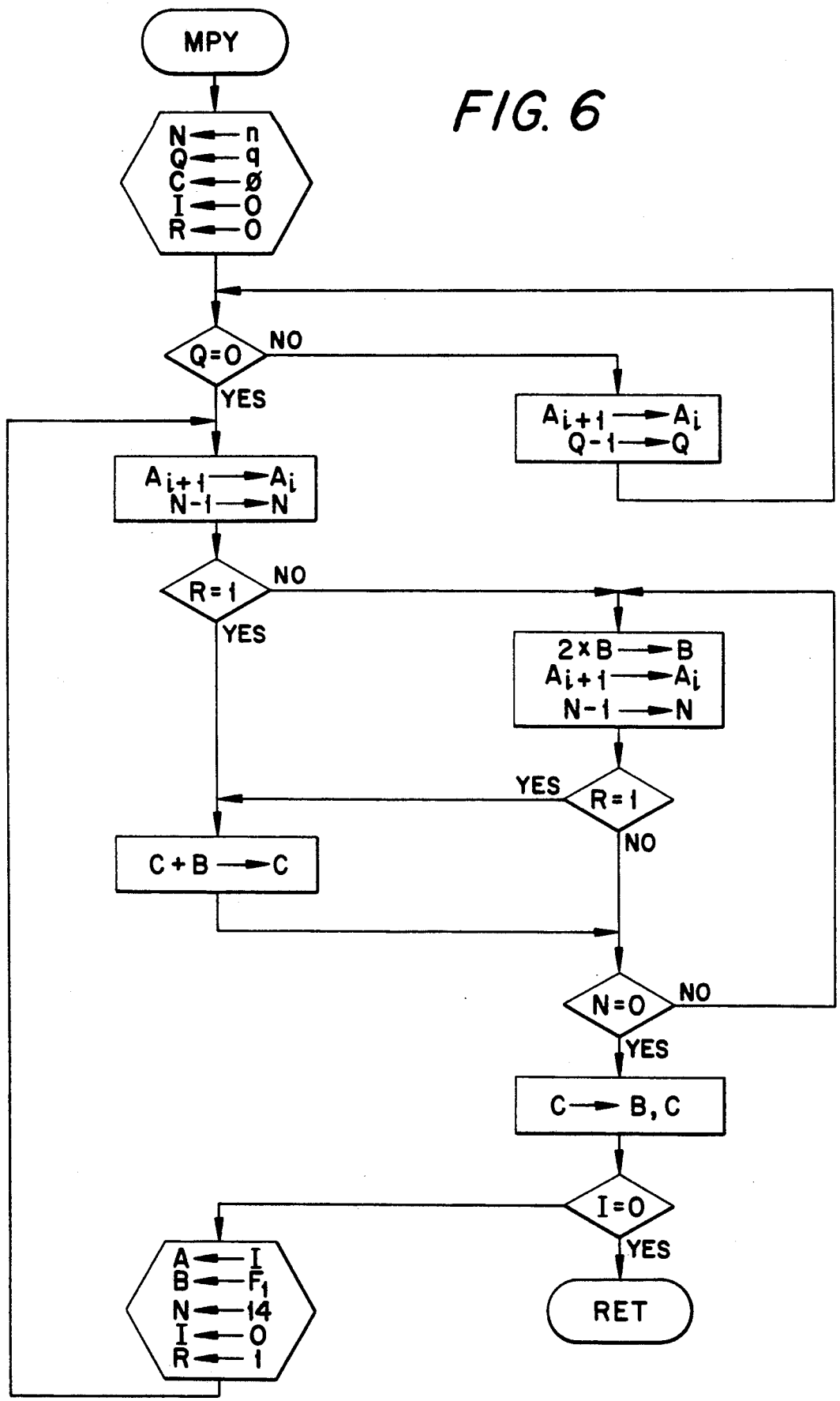
FIG. 6 illustrates the multiply sub-routine of the present invention.

For an n-bit prime, the integer X is an n-bit integer and the result of addition, multiplication, or exponentiation is also an n-bit integer. To allow for the mismatch between L and n, the n-bit integers X and F are loaded into the highest n-bit register positions of the X and F registers. The highest m-bit positions of the Z registers are loaded with the m-bit integer Z. This is shown in FIG. 5. Essentially, only the upper n cells of the L cell chip are used. The only modification required here is that, at the beginning of each multiplication, the A register must be shifted right by $q = L - n$ steps so that the right end logic is synchronized correctly.

C. Basic Structure with Reduced Adders

To further reduce the amount of circuits the number of full adders can be reduced by sharing each full adder with several register groups. For example in the basic cell described above we have 6 registers and one full adder per basic cell. Suppose we were to combine two groups of 6 registers each with one full adder to form a basic cell of 12 registers and one full adder. Then the total number of basic cells is reduced by two but each basic cells has 6 more registers. Similarly, three groups of 6 registers can share a single full adder to make a basic cell resulting in fewer larger basic cells.

Suppose there are K groups of 6 registers each which share one full adder to make a basic cell. Then there are 6K registers and one full adder in a basic cell and a total of L/K basic cells where L was the original number of basic cells in the normal basic structure described in the previous section. Note that this reduces the number of full adders overall with a modest increase in switching functions that switch between different groups of 6 registers in each basic cell.

One good choice of the number K is based on the number of adder carry propagation steps that can be achieved between clock pulses. Suppose that during the time between clock pulses the number of carry propagation steps is greater than K. Then for each clock pulse one row of 7 registers per cell can complete the partial addition of the L bit integers. Then one complete addition of two integers will take L/K clock pulses. This appears to be a good design compromise between speed of computations and minimizing circuits.

CHIP CONTROLLER

Let n be the number of bits in the representation of the prime p, $$p = \sum_{k=1}^{n-1} P[k]2^k$$

where $P[n-1]=1$.

Related control parameters are n, m, and q where
n = number of bits representing p
m = number of bits representing Z
q = L-n With these parameters entered into control registers, the n-bits inputs X and F and m-bit input Z are entered before each calculation.

A. Basic Subroutines

Multiplication is represented in flowcharts as,

*MPY* overflow compensation is represented as,

*OVF*

Compensation

Figure 9:
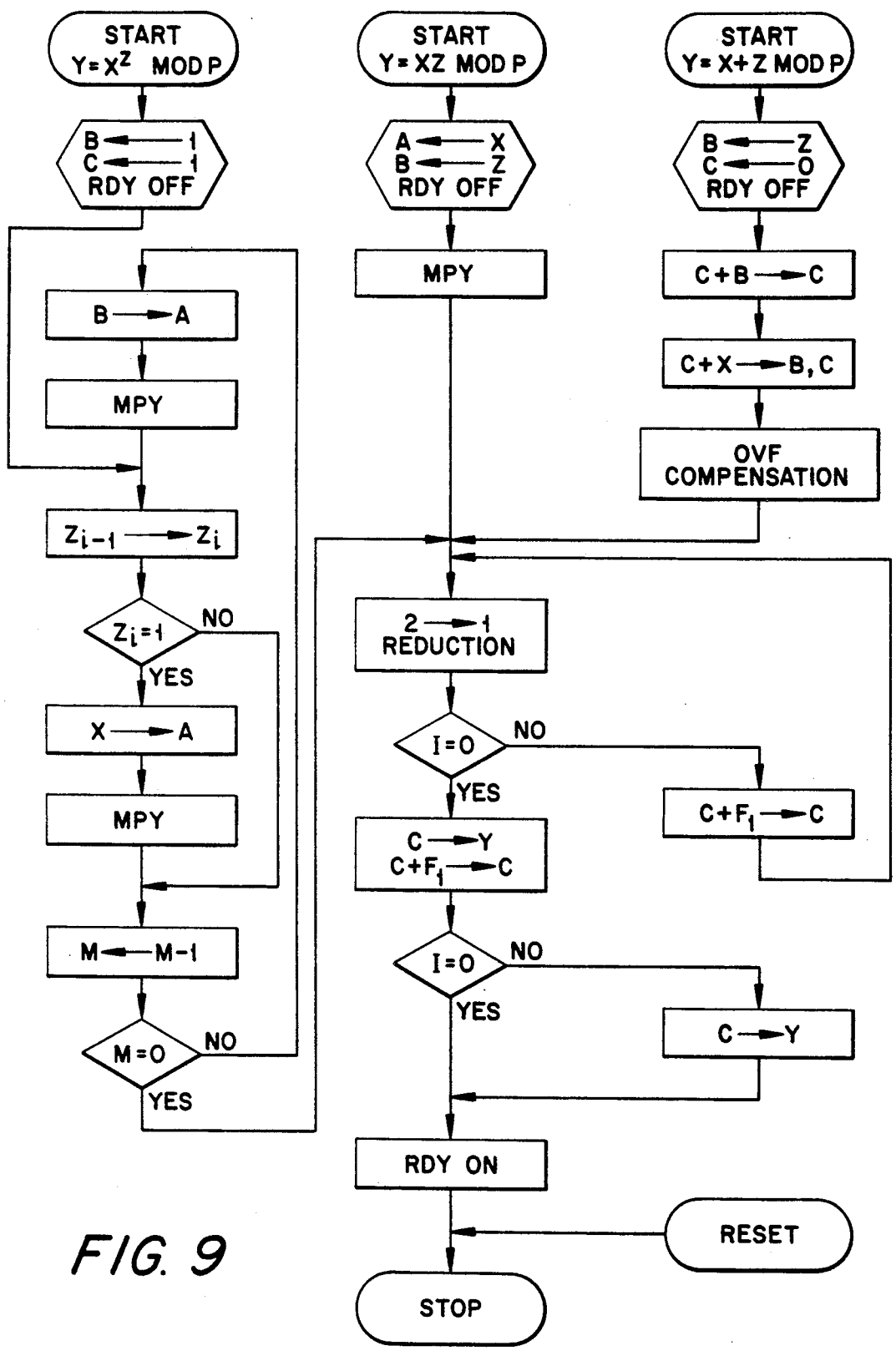
FIG. 9 is an overall flow chart of the processor chip of the present invention.

The two subroutine are shown in FIG. 9. The counter in FIG. 2 has count integer denoted I, which is the overflow index used in these subroutines.

Multiplication is the most common subroutine used in exponentiation. Overflow compensation is used to check for a $2^n$ term in the counter (see FIG. 2) and, if so, apply a feedback term using Eq. (1).

Accordingly, the present invention includes a method using a modulo arithmetic processor chip for adding a first integer X having a plurality of groups of bits to a second integer Z having plurality of groups of bits. The first integer X plus the second integer Z equals a third integer Y having n-bits, modulo a fourth integer p having n-bits. Thus, $Y=(X+Z) \mod p$. The method comprises the steps, performed by the modulo arithmetic processor chip, of: storing the first integer X in first register means; storing the second integer Z in second register means; generating and storing a feedback number F in feedback means, wherein the feedback number F is the two's complement of the fourth integer p and thereby $F=2^n-p$; generating the third integer Y by sequentially adding each group of bits of the first integer X to each group of bits of the second integer Z in arithmetic means during a time period, wherein each group of bits of the first integer X and a corresponding group of bits of the second integer Z are added asynchronously during the time period; storing the third integer Y in accumulator means; storing an overflow integer in overflow means; fetching the feedback number F into the second register B and adding the feedback number F using arithmetic means to the third integer Y in the accumulator means; and reducing the third integer Y modulo the fourth integer p in means coupled to the accumulator means, when the third integer Y is greater than the fourth integer p.

The present invention also includes a method using a modulo arithmetic processor chip for multiplying a first integer X by a second integer Z having a plurality of groups of bits. The first integer X times the second integer Z equals a third integer Y having a plurality of groups of bits, modulo a fourth integer p having n-bits. Thus, $Y=XZ \mod p$. The method comprises the steps, performed by the modulo arithmetic processor chip, of: storing the first integer X in first register means; storing the second integer Z in second register means; generating a feedback number F in feedback means, wherein the feedback number F is the two's compliment of the fourth integer p and thereby $F=2^n-p$; adding the feedback number F to the second integer Z in response to the most significant position of the second integer Z shifted left from the second register means, thereby partially reducing the second integer Z; adding each group of bits of the second integer Z to each group of bits of the third integer Y in arithmetic means during a time period, wherein each group of bits of the second integer Z and a corresponding group of bits of the third integer Y are added asynchronously during the time period in response to the least significant position of the first integer X shifted right from the first register means; storing the third integer Y in accumulator means; counting and storing overflow bits as an overflow integer I in overflow means; transferring the overflow integer I into the first register means, transferring the feedback number F into the second register means, and multiplying feedback number F by the overflow integer I to generate a product, and adding the product to the third integer Y in the accumulator means in second-partial-reductions means in response to the completion of multiplying the first integer X by the second integer B; and reducing third integer Y modulo the fourth integer p in response to the third integer Y being greater than the fourth integer p.

B. Overall Control Program

Using the subroutines described above, the overall control flowchart is shown in FIG. 10. The flowchart comprises three separate functions of exponentiation, multiplication, and addition followed by a common part that first reduces the answer in the C register into a final mod p reduction.

It will be apparent to those skilled in the art that various modifications can be made to the processor chip of the instant invention without departing from the scope or spirit of the invention, and it is intended that the present invention cover modifications and variations of the processor chip provided they come within the scope of the appended claims and their equivalents. Further, it is intended that the present invention cover present and new applications of the processor chip, including smart cards, public key management for encryption, and message authentication.

This chip design also applies to addition, multiplication, and exponentiation of integers modulo any other integer. In other words, the modulus is not restricted to be a prime number. The modulus, for example, may be the product of two prime numbers as in the RSA public key arithmetic processing.

I claim:

1. A modulo arithmetic processor chip for adding a first integer X having a plurality of groups of bits to a second integer Z having a plurality of groups of bits, wherein the first integer X plus the second integer Z equals a third integer Y, modulo a fourth integer p having n-bits, whereby $Y=(X+Z) \bmod p$, comprising:

first register means for storing the first integer X;

second register means for storing the second integer Z;

feedback means for generating and storing a feedback number F, wherein the feedback number F is the two's complement of the fourth integer p and thereby $F=2^n-p$;

arithmetic means coupled to said first register means and said second register means, for generating the third integer Y by sequentially adding each group of bits of the first integer X to a corresponding group of bits of the second integer Z during a time period, wherein each group of bits of the first integer X and the corresponding group of bits of the second integer Z are added asynchronously during the time period;

accumulator means coupled to said arithmetic means for storing the third integer Y;

overflow means coupled to said accumulator means for storing an overflow integer;

means coupled to said overflow means and said second register means and responsive to the overflow integer, for fetching the feedback number F into said second register Z and adding the feedback number F using arithmetic means to the third integer Y in said accumulator means; and means coupled to the accumulator means and responsive to the third integer Y being greater than the fourth integer p, for reducing the third integer Y modulo the fourth integer p.

2. The modulo arithmetic processor chip as set forth in claim 1 wherein:

said first register means includes a first plurality of registers;

said second register means includes a second plurality of registers; and said arithmetic means includes a plurality of full adders coupled to said first plurality of registers and said second plurality of registers, for sequentially adding each group of bits of the first integer X to the corresponding group of bits of the second integer Z during a time period.

3. A modulo arithmetic processor chip for multiplying a first integer X by a second integer Z having a plurality of groups of bits, wherein the first integer X times the second integer Z equals a third integer Y having a plurality of groups of bits, modulo a fourth integer p having n-bits, whereby $Y=X\cdot Z \bmod p$, comprising:

first register means for storing the first integer X;

second register means for storing the second integer Z;

feedback means for generating a feedback number, F, wherein the feedback number F is the two's complement of the fourth integer p and thereby $F=2^n-p$;

first-partial-reduction means coupled to said second register means and responsive to the most significant position of the second integer Z shifted left from said second register means for adding the feedback number F to the second integer Z, thereby partially reducing the second integer Z;

arithmetic means coupled to said first register means, and said second register means, and responsive to the least significant position of the first integer X shifted right from said first register means, for sequentially adding each group of bits of the second integer Z to a corresponding group of bits of the third integer Y during a time period, wherein each group of bits of the second integer Z and the corresponding group of bits of the third integer Y are added asynchronously during the time period;

accumulator means coupled to said arithmetic means for storing the third integer Y;

overflow means coupled to said accumulator means for counting and storing overflow bits as an overflow integer I;

second-partial-reductions means coupled to said first register means, said second register means, said overflow means and said arithmetic means, and responsive to the completion of multiplying the first integer X by the second integer Z, for transferring the overflow integer I into said first register means, transferring the feedback number F into said second register means, multiplying feedback number F by the overflow integer I to generate a product, and adding the product to the third integer Y in said accumulator means; and means coupled to said accumulator means and responsive to the third integer Y being greater than the fourth integer p, for reducing third integer Y modulo the fourth integer p.

4. The modulo arithmetic processor chip as set forth in claim 3 wherein:

said first register means includes a first plurality of registers;

said second register means includes a second plurality of registers; and said arithmetic means includes a plurality of full adders coupled to said first plurality of registers and said second plurality of registers, for sequentially adding each group of bits of the second integer Z to the corresponding group of bits of the third integer Y during a time period.

5. A modulo arithmetic processor chip for multiplying a first integer X by a second integer Z having a plurality of groups of bits, wherein the first integer X times the second integer Z equals a third integer Y having a plurality of groups of bits, modulo a fourth integer p having n-bits, whereby $Y=X\cdot Z \bmod p$, comprising:

first register means for storing the first integer X;

second register means for storing the second integer Z;

feedback means for generating a feedback number F, wherein the feedback number F is the two's complement of the fourth integer p and thereby $F=2^n-p$;

first-partial-reduction means coupled to said second register means and responsive to the most significant position of the second integer Z shifted left from said second register means, for adding the feedback number F to the second integer Z, thereby partially reducing the second integer Z;

arithmetic means coupled to said first register means and said second register means, and responsive to the least significant position of the first integer X shifted right from said first register means, for sequentially adding each group of bits of the second integer Z to a corresponding group of bits of the third integer Y during a time period, wherein each group of bits of the second integer Z and the corresponding group of bits of the third integer Y are added asynchronously during the time period;

accumulator means coupled to said arithmetic means for storing the third integer Y;

overflow means coupled to said accumulator means for counting and storing overflow bits as an overflow integer I;

second-partial-reduction means coupled to said overflow means, said feedback means, said first-register means and said second-register means, and responsive to the completion of multiplying the first integer X by the second integer Z, for transferring the overflow integer I into said first register means, transferring the feedback number F into said second register means, multiplying feedback number F by the overflow integer I to generate a product, and adding the product to the third integer Y in said accumulator means; and means coupled to said accumulator means and responsive to the third integer Y being greater than the fourth integer p, for reducing the third integer Y modulo the fourth integer p.

6. The modulo arithmetic processor chip as set forth in claim 5 wherein:
said first register means includes a first plurality of registers;
said second register means includes a second plurality of registers; and
said arithmetic means includes a plurality of full adders coupled to said first plurality of registers and said second plurality of registers, for sequentially adding the group of bits of the second integer Z to the corresponding group of bits of the third integer Y during a time period.

7. A modulo arithmetic processor chip for multiplying a first integer X by a second integer Z having a plurality of groups of bits, wherein the first integer X times the second integer Z equals a third integer Y having a plurality of groups of bits, modulo a fourth integer p having n-bits, whereby $Y=X \cdot Z$ mod p, comprising:

first register means for storing the first integer X;
second register means for storing the second integer Z;
feedback means for generating and storing a feedback number F, wherein the feedback number F is the two's complement of the fourth integer p and thereby $F=2^n-p$;
first-partial-reduction means coupled to said second register means and responsive to the most significant position of the second integer Z shifted left from said second register means, for adding the feedback number F to the second integer Z, thereby partially reducing the second integer Z;

arithmetic means coupled to said first register means and said second register means, and responsive to the least significant position of the first integer X shifted right from said first register means, for sequentially adding each group of bits of the second integer Z to a corresponding group of bits of the third integer Y during a time period, wherein each group of bits of the second integer Z and the corresponding group of bits of the third integer Y are added asynchronously during the time period;

accumulator means coupled to said arithmetic means for storing the third integer Y;

second-partial-reduction means coupled to said first register means, said second register means, said overflow means, said feedback means, and said arithmetic means, and responsive to the completion of multiplying the first integer X by the second integer Z, for transferring the overflow integer I into said first register means, transferring the feedback number F into said second register means, multiplying feedback number F by the overflow integer I to generate a product, and adding the product to the third integer Y in said accumulator means; and means coupled to said accumulator means and responsive to the third integer Y being greater than the fourth integer p, for reducing the third integer Y modulo the fourth integer p.

8. The modulo arithmetic processor chip as set forth in claim 7 wherein:
said first register means includes a first plurality of registers;
said second register means includes a second plurality of registers; and
said arithmetic means includes a plurality of full adders coupled to said first plurality of registers and said second plurality of registers, for sequentially adding each group of bits of the second integer Z to the corresponding group of bits of the third integer Y during a time period.

9. A method using a modulo arithmetic processor chip for adding a first integer X having having a plurality of groups of bits to a second integer Z having a plurality of groups of bits, wherein the first integer X plus the second integer Z equals a third integer Y having n-bits, modulo a fourth integer p having n-bits, whereby $Y=(X+Z)$ mod p, comprising the steps, performed by said modulo arithmetic processor chip, of:

storing the first integer X in first register means;
storing the second integer Z in second register means;
generating and storing a feedback number F in feedback means, wherein the feedback number F is the two's complement of the fourth integer p and thereby $F=2^n-p$;
generating the third integer Y by sequentially adding each group of bits of the first integer X to a corresponding group of bits of the second integer Z in arithmetic means during a time period, wherein each group of bits of the first integer A and a group of bits of the second integer Z are added asynchronously during the time period;
storing the third integer Y in accumulator means which is coupled to said arithmetic means;
storing an overflow integer in overflow means which is coupled to said accumulator means;

fetching the feedback number F into said second register Z and adding the feedback number F using arithmetic means to the third integer Y in said accumulator means; and reducing the third integer Y modulo the fourth integer p in means coupled to the accumulator means, when the third integer Y is greater than the fourth integer p.

10. A method using a modulo arithmetic processor chip for multiplying a first integer X having n-bits by a second integer Z having a plurality of groups of bits, wherein the first integer X times the second integer Z equals a third integer Y having a plurality of groups of bits, modulo a fourth integer p having n-bits, whereby $Y = X \cdot Z \mod p$, comprising the steps, performed by said modulo arithmetic processor chip, of:

storing the first integer X in first register means;

storing the second integer Z in second register means;

generating a feedback number F in feedback means, wherein the feedback number F is the two's complement, of the fourth integer p and thereby $F = 2^n - p$;

adding the feedback number F to the second integer Z in response to the most significant position of the second integer Z shifted left from said second register means, thereby partially reducing the second integer Z;

adding sequentially each group of bits of the second integer Z to a corresponding group of bits of the third integer Y in arithmetic means during a time period, wherein each group of bits of the first integer X and the corresponding group of bits of the second integer Z are added asynchronously during the time period in response to the least significant position of the first integer X shifted right from said first register means;

storing the third integer Y in accumulator means;

counting and storing overflow bits as an overflow integer I in overflow means;

transferring the overflow integer I into said first register means, transferring the feedback number F into said second register means, and multiplying feedback number F by the overflow integer I to generate a product, and adding the product to the third integer Y in said accumulator means in second-partial-reductions means in response to the completion of multiplying the first integer X by the second integer Z; and reducing third integer Y modulo the fourth integer p in response to the third integer Y being greater than the fourth integer p.

11. A method using a modulo arithmetic processor chip for multiplying a first integer X having n-bits by a second integer Z having a plurality of groups of bits, wherein the first integer X times the second integer Z equals a third integer Y having a plurality of groups of bits, modulo a fourth integer p having n-bits, whereby $Y = X \cdot Z \mod p$, comprising the steps, performed by said modulo arithmetic processor chip, of:

storing the first integer X in first register means;

storing the second integer Z in second register means;

generating a feedback number F in feedback means, wherein the feedback number F is the two's complement of the fourth integer p and thereby $F = 2^n - p$;

adding sequentially in arithmetic means, in response to the least significant position of the first integer X shifted right from said first register means, group of bits of the second integer Z to corresponding group of bits of the third integer Y during a time period, wherein each group of bits of the second integer Z and the corresponding group of bits of the third integer Y are added asynchronously during the time period;

storing the third integer Y in accumulator means;

counting and storing overflow bits as an overflow integer I in overflow means;

transferring the overflow integer I into said first register means, transferring the feedback number F into said second register means, and multiplying feedback number F by the overflow integer I to generate a product, and adding the product to the third integer Y in said accumulator means, in response to the completion of multiplying the first integer X by the second integer Z; and reducing the third integer Y modulo the fourth integer p in response to the third integer Y being greater than the fourth integer p.

12. A modulo arithmetic processor chip for multiplying a first integer X having n-bits by a second integer Z having a plurality of groups of bits, wherein the first integer X times the second integer Z equals a third integer Y having a plurality of groups of bits, modulo a fourth integer p having n-bits, whereby $Y = X \cdot Z \mod p$, comprising the steps, performed by said modulo arithmetic processor chip, of:

storing the first integer X in first-register means;

storing the second integer Z in second-register means;

generating and storing a feedback number F in feedback means, wherein the feedback number F is the two's complement of the fourth integer p and thereby $F = 2^n - p$;

adding the feedback number F to the second integer Z in response to the most significant position of the second integer Z shifted left from said second register means, thereby partially reducing the second integer Z;

adding sequentially each group of bits of the second integer Z to a corresponding group of bits of the third integer Y in arithmetic means during a time period, wherein each group of bits in response to the least significant position of the first integer X shifted right from said first register means, the second integer Z and the corresponding group of bits of the third integer Y are added asynchronously during the time period;

storing the third integer Y in accumulator means; and reducing the third integer Y modulo the fourth integer p in response to the third integer Y being greater than the fourth integer p.

13. A method using a modulo arithmetic processor chip for adding a first integer X having a plurality of groups of bits to a second integer Z having a plurality of groups of bits, wherein the first integer X plus the second integer Z equals a third integer Y having n-bits, modulo a fourth integer p having n-bits, whereby $Y = (X + Z) \mod p$, comprising the steps, performed by said modulo arithmetic processor chip, of:

storing the first integer X in first register means;

storing the second integer Z in second register means;

generating and storing a feedback number F in feedback means, wherein the feedback number F is the two's complement of the fourth integer p and thereby $F = 2^n - p$;

generating the third integer Y by adding sequentially each group of bits of the first integer X to each group of bits the second integer Z during a time period, wherein each group of bits of the second integer Z and the corresponding group of bits of the third integer Y are added asynchronously during the time period;

storing the third integer Y in accumulator means;

storing an overflow integer in overflow means;

fetching the feedback number F into said second register Z and adding the feedback number F to the third integer Y; and reducing the third integer Y modulo the fourth integer p, when the third integer Y is greater than the fourth integer p.

* * * * *